United States Patent [19]

Urushibata et al.

[11] Patent Number: 5,172,361
[45] Date of Patent: Dec. 15, 1992

[54] DISC LOADING APPARATUS

[75] Inventors: Hiroyuki Urushibata, Kanagawa; Kazuya Okushita, Tokyo, both of Japan

[73] Assignee: Sony Corporation, Tokyo, Japan

[21] Appl. No.: 789,448

[22] Filed: Nov. 7, 1991

Related U.S. Application Data

[63] Continuation of Ser. No. 525,673, May 21, 1990, abandoned.

[30] Foreign Application Priority Data

Jun. 1, 1989 [JP] Japan .................. 1-139782

[51] Int. Cl.⁵ ..................... G11B 33/02; G11B 27/00
[52] U.S. Cl. ................... 369/77.1; 369/75.2; 369/270
[58] Field of Search ............ 369/75.1, 75.2, 77.1, 369/77.2, 183, 215, 219, 270; 360/99.02, 99.03, 99.06, 99.07, 98.02, 98.07

[56] References Cited

U.S. PATENT DOCUMENTS

| | | | |
|---|---|---|---|
| 3,827,697 | 8/1974 | Miyoshi | 369/182 |
| 4,039,194 | 8/1977 | Nakagawa | 369/182 |
| 4,628,498 | 12/1986 | Takamatsu et al. | 369/77.1 |
| 4,636,628 | 1/1987 | Tsukai | 369/44.24 |
| 4,701,901 | 10/1987 | Imai | 369/75.2 |
| 4,773,057 | 9/1988 | Otsuka et al. | 369/75.2 |
| 4,829,508 | 5/1989 | Arita | 369/215 |
| 4,890,276 | 12/1989 | Ono et al. | 369/77.2 |
| 4,949,328 | 8/1990 | Kase et al. | 369/75.2 |

FOREIGN PATENT DOCUMENTS

| | | |
|---|---|---|
| 0164788 | 12/1985 | European Pat. Off. . |
| 0185140 | 6/1986 | European Pat. Off. . |
| 0126442 | 4/1987 | European Pat. Off. . |
| 2152267 | 7/1985 | United Kingdom . |

*Primary Examiner*—Stuart S. Levy
*Assistant Examiner*—Tan Nguyen
*Attorney, Agent, or Firm*—Lewis H. Eslinger; Jay H. Maoili

[57] ABSTRACT

An optical disc player having a disc tray on which an optical disc is loaded and which is supported by a first chassis so that it can be freely moved between a disc loading position and a disc reproducting position, a second chassis to which a disc rotating device is supported and which is provided to move in a vertical direction relative to the first chassis, an elevating mechanism for moving the second chassis in the vertial direction, an optical pickup supporting arm supported to the second chassis adapted to skew relative to a disc surface and on which an optical pickup is provided, a transmission mechanism for transmitting a rotation force of a motor, a rotation operation member rotated by the transmission mechanism and which has a gear portion to be meshed with the disc tray to move the same and a cam groove engaged with the elevating mechanism to move the second chassis in the up and down direction, and a cam member rotated by the rotation operation member and which has a cam groove engaged with the optical pickup supporting portion to skew the same.

7 Claims, 8 Drawing Sheets

DISC LOADING APPARATUS

This is a continuation of application Ser. No. 07/525,673, filed May 21, 1990, now abandoned.

BACKGROUND OF THE INVENTION

1. Field of the Invention

The present invention relates generally to optical disc players and, more particularly, is directed to a disc loading apparatus for use in an optical disc player and in which a skewed amount of an optical disc is detected and an optical pickup head is controlled by a tilt adjusting mechanism on the basis of the detected output so that an optical axis of the optical pickup head remains perpendicular to a record surface of the optical disc.

2. Description of the Prior Art

Japanese Utility Model Laid-Open Gazette No. 63-55240 describes a disc loading and chucking mechanism which is applied to most of the existing optical disc players. According to this previously-proposed disc loading and chucking mechanism, a disc tray on which an optical disc is held is horizontally withdrawn to the disc reproducing position and then, a movable chassis on which a disc table is supported is elevated, whereby the optical disc is chucked to the disc table.

Incidentally, various kinds of optical discs are now available on the market, for example, optical video disc (i.e., optical video disc (VD)), VD single (optical video disc of small diameter), compact disc (CD), CD single (compact disc of small diameter) and the like. The optical video disc (VD), in particular, is large in diameter and weighs much so that, when this optical video disc is chucked on the disc table, the outer peripheral portion thereof is unavoidably skewed downward by a very small amount due to its own weight. To solve this problem, it has been proposed that the optical disc player is provided with a so-called tilt adjusting mechanism by which an optical axis of an optical pickup head is properly inclined in accordance with the skewed amount of the optical disc so that the optical axis of the optical pickup head becomes perpendicular to a record surface of the optical disc (see Japanese Patent Laid-Open Gazette No. 63-261542).

In the prior-art optical disc player having the optical pickup head tilt adjusting mechanism, the disc loading and the disc chucking are performed by driving a first motor, and the tilt adjustment of the optical pickup head is performed by driving a second motor.

Further, in the chucking mechanism of the prior-art optical disc player, a movable chassis on which the disc table is supported is connected to a fixed or stationary chassis so that it can rotate with an inclination, thereby to move the disc table in the upper and/or lower direction.

The above-described optical disc player according to the prior art includes not only the motor for effecting the first disc loading and disc chucking but also the motor for effecting the second tilt adjustment of the optical pickup head. In other words, this optical disc player has a two-motor drive system and therefore it becomes expensive to manufacture.

Furthermore, in the prior-art chucking mechanism of the optical disc player, since the movable chassis is supported on the stationary chassis so that it can rotate with an inclination, a supporting point of the movable chassis must be placed at the position very distant from the chucking portion, which makes the mechanism large in size. For this reason, it is very difficult to keep a space large enough to provide therein other mechanism parts and circuit boards.

OBJECTS AND SUMMARY OF THE INVENTION

Accordingly, it is an object of the present invention to provide an improved optical disc player which can eliminate the aforenoted shortcomings and disadvantages encountered with the prior art.

More specifically, it is an object of the present invention to provide an optical disc player which can be simplified in arrangement.

It is another object of the present invention to provide an optical disc player which can be made inexpensively.

It is still another object of the present invention to provide an optical disc player in which mechanisms incorporated therein can be made compact in size to provide an excellent space factor.

It is a further object of the present invention to provide an optical disc player in which freedom in designing circuit boards and an outer casing can be increased.

It is yet a further object of the present invention to provide an optical disc player which can be suitably applied to various kinds of optical discs.

According to a first aspect of the present invention, an optical disc player is comprised of a disc carrying mechanism provided so as to freely move between a disc removal position extending from a player body and a position with the disc drawn into the player body, a drive mechanism provided with a rotation operation member having a cam groove for moving the disc carrying mechanism between the disc removal position and the disc drawn-in position, an elevating mechanism engaged with the cam groove of the rotation operation member for moving a player portion in the up and down direction, a pickup supporting arm supported to the player portion so as to skew relative to a disc surface and having an optical pickup head provided thereon, and a cam member rotated by the rotation operation member and which has a cam groove engaged with the pickup supporting arm for skewing the pickup supporting arm along the cam groove.

As a second aspect of this invention, an optical disc player is comprised of a disc tray on which an optical disc is loaded and supported to a first chassis so that it can be freely moved between a disc loading position and a disc reproduction position, a second chassis to which a disc rotating mechanism is supported and which can be moved up and down relative to the first chassis, an elevating mechanism for moving the second chassis in the up and down direction, and a drive mechanism for moving the disc tray and which operates the elevating mechanism, wherein the second chassis is moved up and down in substantially the vertical direction.

These, and other objects, features and advantages of the present invention, will be apparent in the following detailed description of a preferred embodiment when read in conjunction with the accompanying drawings, in which like reference numerals are used to identify the same or similar parts in the several views.

DETAILED DESCRIPTION OF A PREFERRED EMBODIMENT

The present invention will now be described in detail with reference to the drawings.

Figure 3A:
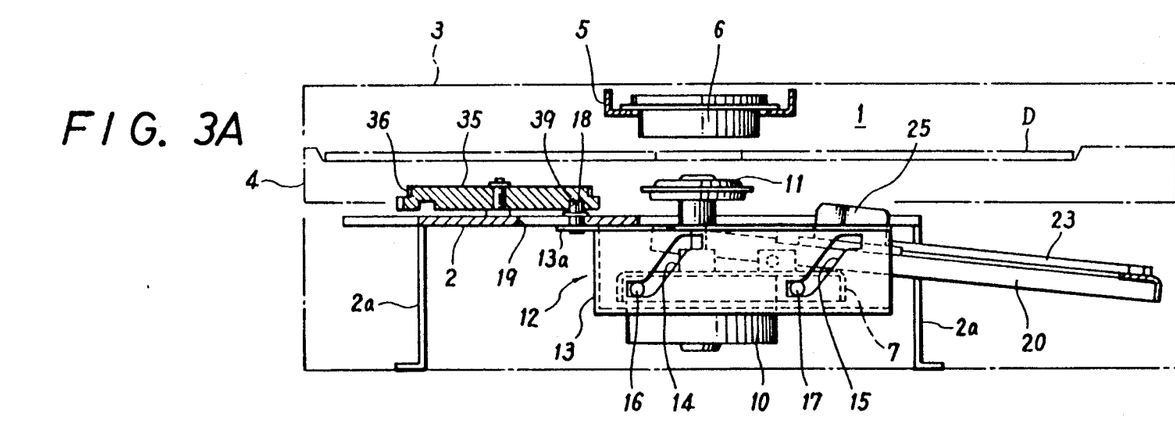
FIGS. 3A and 3B are side views of the optical disc player shown in FIG. 1 with a part being removed, respectively.
Figure 3B:
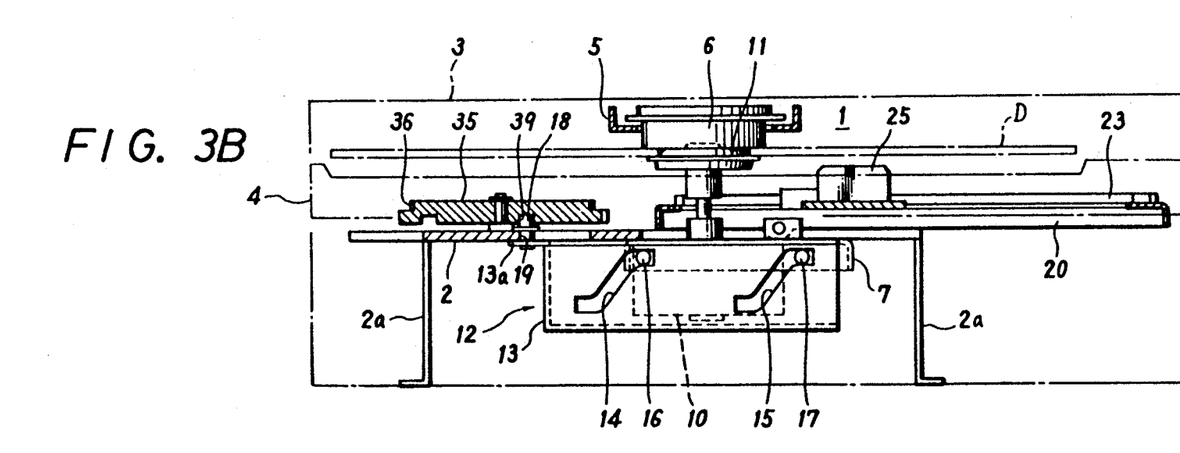

In the figures, reference numeral 1 generally designates a drive mechanism of an optical disc player of the present invention. Reference numeral 2 generally designates a fixed or stationary chassis provided as a first chassis to which drive mechanism portions and parts are supported. As shown in FIGS. 3A and 3B, the stationary chassis 2 is secured to an outer casing 3 via leg portions 2a thereof.

Figure 1:
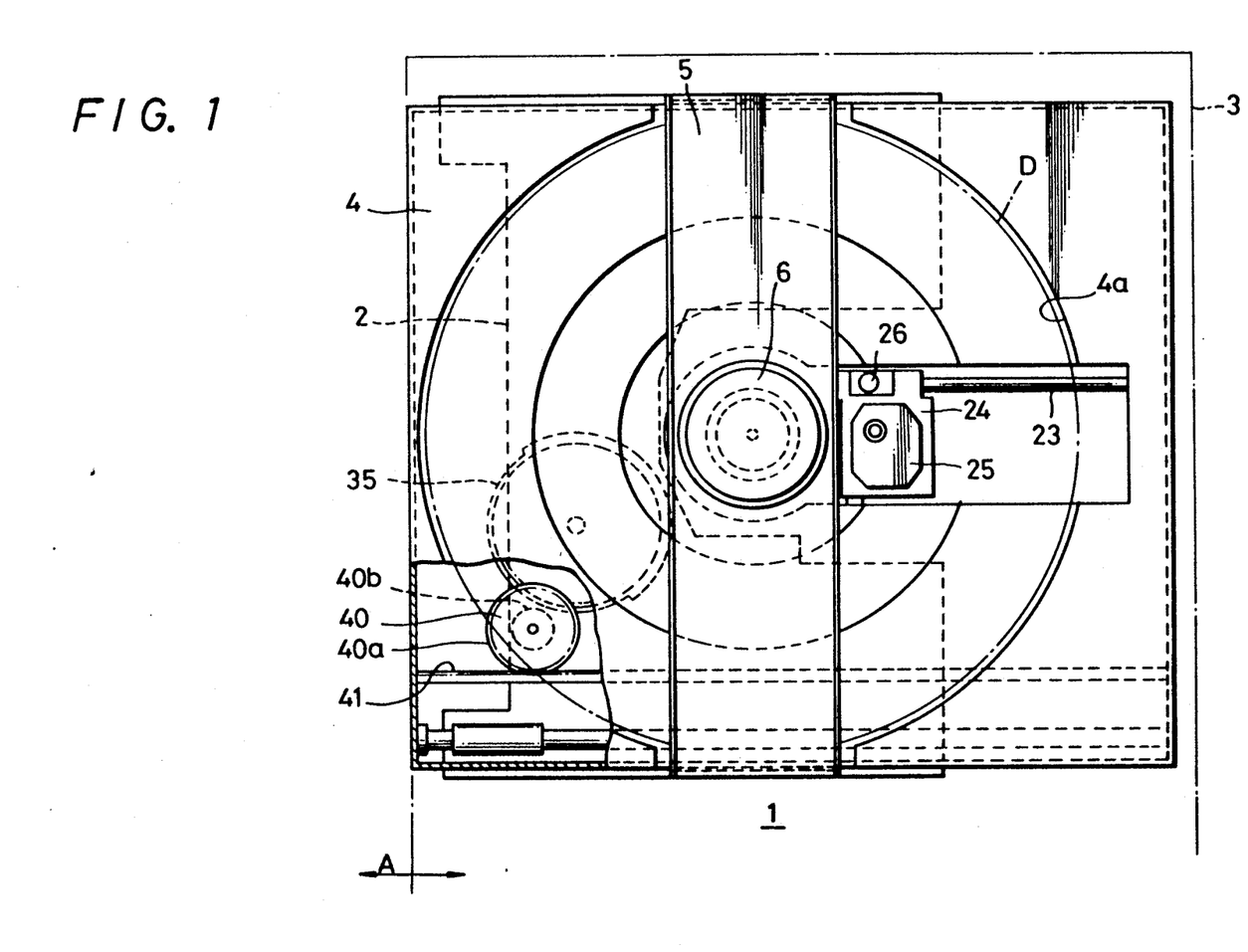
FIG. 1 is a plan view illustrating an embodiment of an optical disc player according to the present invention.

The stationary chassis 2 supports on an upper surface side thereof a disc tray 4 for holding thereon an optical disc D such that the disc tray 4 may freely move back and forth (i.e., in the direction shown by an arrow A in FIG. 1) between the disc loading position and the disc reproducing position. In FIG. 1, the left-handed side portion represents the front direction and the right-handed side portion represents the rear direction. The disc tray 4 forms on an upper surface thereof a concave portion 4a on which the optical disc D is loaded. The concave portion 4a of the disc tray 4 is formed of a plurality of circular, concentric concave portions whose diameters become smaller as they reach the center so that it can hold thereon various kinds of discs, such as, optical video disc (VD), VD single (optical video disc of small diameter), compact disc (CD), CD single (compact disc of small diameter) and the like.

Above the stationary chassis 2 and between its front and rear side end portions there is stretched a supporting plate 5 to bridge the disc tray 4. The supporting plate 5 is provided at a central portion thereof with a rotatable chucking member 6 which is opposed to and magnetically attracted by a disc table that will be described later.

Figure 2:
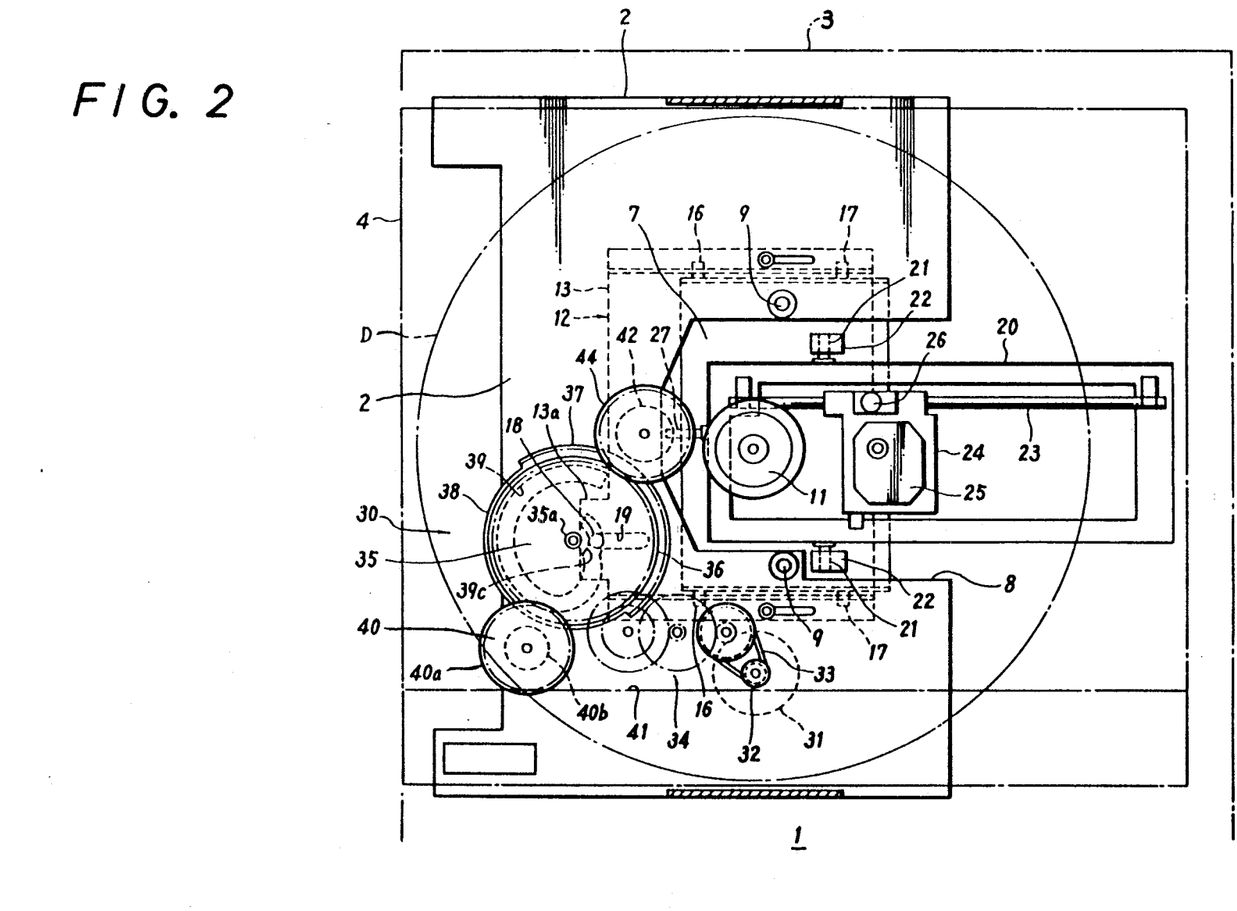
FIG. 2 is a plan view of the optical disc player shown in FIG. 1, and in which a disc tray is removed so as to facilitate the understanding of the construction thereof.

As shown in FIG. 2, the stationary chassis 2 supports on a lower surface thereof a movable chassis 7 as a second chassis so that the movable chassis 7 may move up and down in the vertical direction. The movable chassis 7 is located so as to cross a concave portion 8 which is formed as a recess portion extending from the rear end edge portion to the central portion of the stationary chassis 2. Also, the movable chassis 7 is supported on the stationary chassis 2 so as to move up and down along a pair of vertical guide shafts 9 vertically projected from the stationary chassis 2. As shown in FIGS. 3A and 3B, a spindle motor 10 is secured to the movable chassis 7 as a disc rotating device, and a disc table 11 is attached to the top of a drive shaft of the spindle motor 10.

As shown in FIGS. 3A and 3B, the stationary chassis 2 supports on a lower surface side thereof an elevating mechanism 12 which moves the movable chassis 7 up and down in the vertical direction. The elevating mechanism 12 is formed of a sliding member 13 which is supported on the lower surface side of the stationary chassis 2 so as to slide back and forth along the lower surface of the stationary chassis 2. An overall configuration of the slide member 13 is substantially a box-shape whose two side surface portions have formed therethrough two elongated openings 14 and 15. As shown in FIGS. 3A and 3B, the elongated openings 14 and 15 are so shaped as to be extended at an angle from the lower front direction to the upper rear direction with a large inclination, and respective end portions of the openings 14 and 15 are formed horizontally. The elongated openings 14 and 15 are in engagement with supporting pins 16 and 17 which are projected from the two side portions of the movable chassis 7.

A projected plate portion 13a is formed at the front end portion of the slide member 13 so as to extend under the lower surface side of the stationary chassis 2. A pin 18 implanted on the projected plate portion 13a is projected to the upper surface side of the stationary chassis 2 through an elliptical opening 19 formed through the stationary chassis 2, and is then in engagement with a cam groove of a rotating member which will be described later.

As shown in FIGS. 2, 3A and 3B, a pickup supporting frame 20 for holding thereon an optical pickup head 25 is supported on the movable chassis 7 which is moved up and down by the elevating mechanism 12. The pickup supporting frame 20 is pivotally supported at supporting shafts 21 projected from the two side portions thereof to bearing portions 22 provided at the movable chassis 7, and which thereby skews relative to the record surface of the optical disc D.

A guide rail 23 is secured to the pickup supporting frame 20 along the radial direction of the disc D, and a sliding member 24 is supported by the guide rail 23 so as to slide along the guide rail 23. The optical pickup head 25 is secured to the sliding member 24 in an opposing relation to the record surface of the optical disc D. While the sliding member 24 with the optical pickup head 25 secured thereto is moved by a pre-determined drive mechanism, such drive mechanism is not shown in this embodiment.

Further, a detecting device 26 is provided on the sliding member 24 in the vicinity of the optical pickup head 25 as a tilt sensor for detecting a skewed condition of the optical disc D. For example, in this detecting device 26, a light source such as a light emitting diode (LED) or the like emits a light beam toward the optical disc D, and a reflected-back light beam from the optical disc D is received by two photo-detectors such as photo-diodes, whereby the amount in which the optical axis of the optical pickup head 25 is tilted or skewd, relative to the optical disc D is detected on the basis of a differential output signal from the two photo-diodes.

An engagement lever 27 is projected from the front end face portion of the pickup supporting frame 20. When this engagement lever 27 is engaged with a cam member, which will be described later, the tilt adjustment of the optical pickup head 25 is performed. The pickup supporting frame 20 is rotated and biased by a pre-determined biasing device such that, in the normal condition, the front end portion thereof, i.e., the end portion thereof from which the engagement lever 27 is projected is biased upwards.

Figure 5:
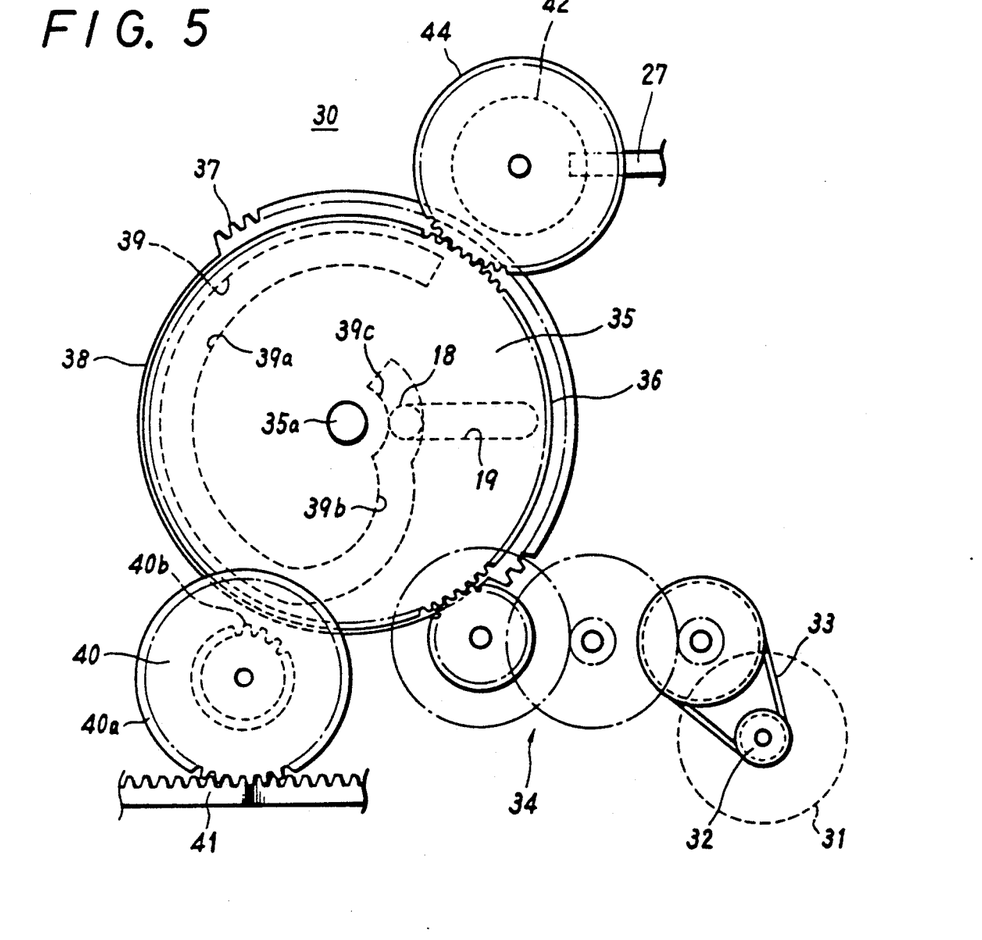
FIG. 5 is an enlarged plan view of a main portion (i.e., operation mechanism portion) of the tilt adjusting mechanism of the invention.

Referring to FIG. 5, there is illustrated an operation mechanism 30 which moves the disc tray 4, moves the movable chassis 7 in the upper and lower direction and which skews the pickup supporting frame 20. Members of the operating mechanism 30 are respectively provided on the upper surface side of the stationary chassis 2 except the motor, as shown in FIG. 2.

As shown in FIG. 5, a motor 31 is secured to the lower surface of the stationary chassis 2 at a pre-determined position thereof as a driving source. A drive shaft of the motor 31 is projected through the upper surface of the stationary chassis 2, and a pulley 32 is attached to the top of the drive shaft of the motor 31.

A revolution of the pulley 32 by the motor 31 is transmitted through a drive belt 33 to reduction gear train 34 which are provided as transmission mechanisms. The reduced revolution of the reduction gear train 34 causes a rotating operation member 35, pivotally provided at the front end portion of the stationary chassis 2, to rotate. In other words, as shown in FIG. 5, an operation gear portion 36 is formed on the whole periphery of the upper surface of the rotating operation member 35, and a final stage gear of the reduction gear train 34 meshes with the operation gear portion 36.

A gear portion 37 is formed around the outer peripheral portion of the lower surface of the rotating operation member 35 over a predetermined range to drive the disc tray 4, as shown in FIG. 1. More precisely, in this embodiment, the gear portion 37 is formed around substantially the semicircular portion of the rotating operation member 35 and the remaining semicircular portion is formed as a geneva stop portion 38.

A cam groove 39 is formed on the lower surface portion of the rotating operation member 35 and, this cam groove 39 is in engagement with the pin 18 of the above-noted elevating mechanism 12. This cam groove 39 is composed of a loading area 39a, a chucking area 39b and a tilt area 39c. The loading area 39a is used to implement the loading of the optical disc D, the chucking area 39b is used to chuck the optical disc D to the disc tray 4 and the tilt area 39c is used to adjust the tilt of the optical pickup head 25. The loading area 39a is formed as an arcuate shape so that it extends about the central rotation shaft 35a of the rotation operation member 35 and along its outer peripheral portion. The chucking area 39b forms an arc which very suddenly approaches the rotation central shaft 35a of the rotation operation member 35 from the end portion of the loading area 39a. Further, the tilt area 39c forms an arc about the rotation central shaft 35a of the rotation operation member 35 in the vicinity thereof.

An idle gear 40 is pivotally supported to the stationary chassis 2 in association with the disc tray drive gear portion 37 of the rotation operation member 35. The idle gear 40 is integrally composed of a large-diameter gear portion 40a provided at the upper portion thereof and a small-gear portion 40b provided at the lower portion thereof. During the disc loading period, the disc tray drive gear portion 37 of the rotation operation member 35 meshes with the small-gear portion 40b, whereas the large-gear portion 40a continuously meshes with a rack gear portion 41 formed on the lower surface side of the disc tray 4, causing the rack gear portion 41 to slide in the same direction as the direction in which the disc tray 4 moves, i.e., in the front and rear direction.

Figure 6:
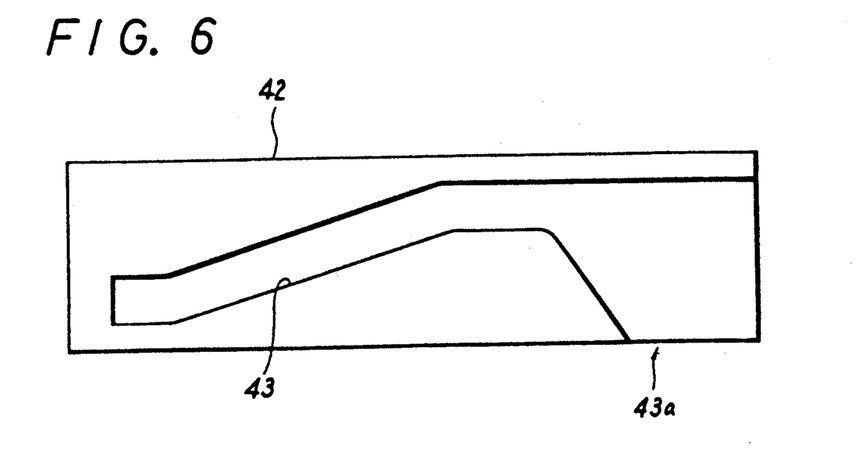
FIG. 6 is an enlarged view of a cam member for implementing a tilt operation.

Further, a tilt operating cam member (hereinafter simply referred to as a cam member) 42 is pivotally provided on the stationary chassis 2 at the position corresponding to the engagement lever 27 of the pickup supporting frame 20. A cam groove 43 is formed on the peripheral surface of the cam member 42. More specifically, as shown in FIG. 6, this cam groove 43 has a shape whose height successively changes and has formed at one end portion thereof an opening portion 43a which opens widely in the downward direction. The engagement lever 27 of the pickup supporting frame 20 engages with the cam groove 43, adjusting the tilt angle of the optical pickup head 25.

A gear portion 44 is formed unitarily with the upper portion of the cam member 42, and this gear portion 44 meshes with the operation gear portion 36 of the rotation operation member 35. In other words, the cam member 42 is rotated by the motor 31 via the rotation operation member 35.

An operation of the optical disc player thus constructed according to this embodiment will be described next.

Figure 7:
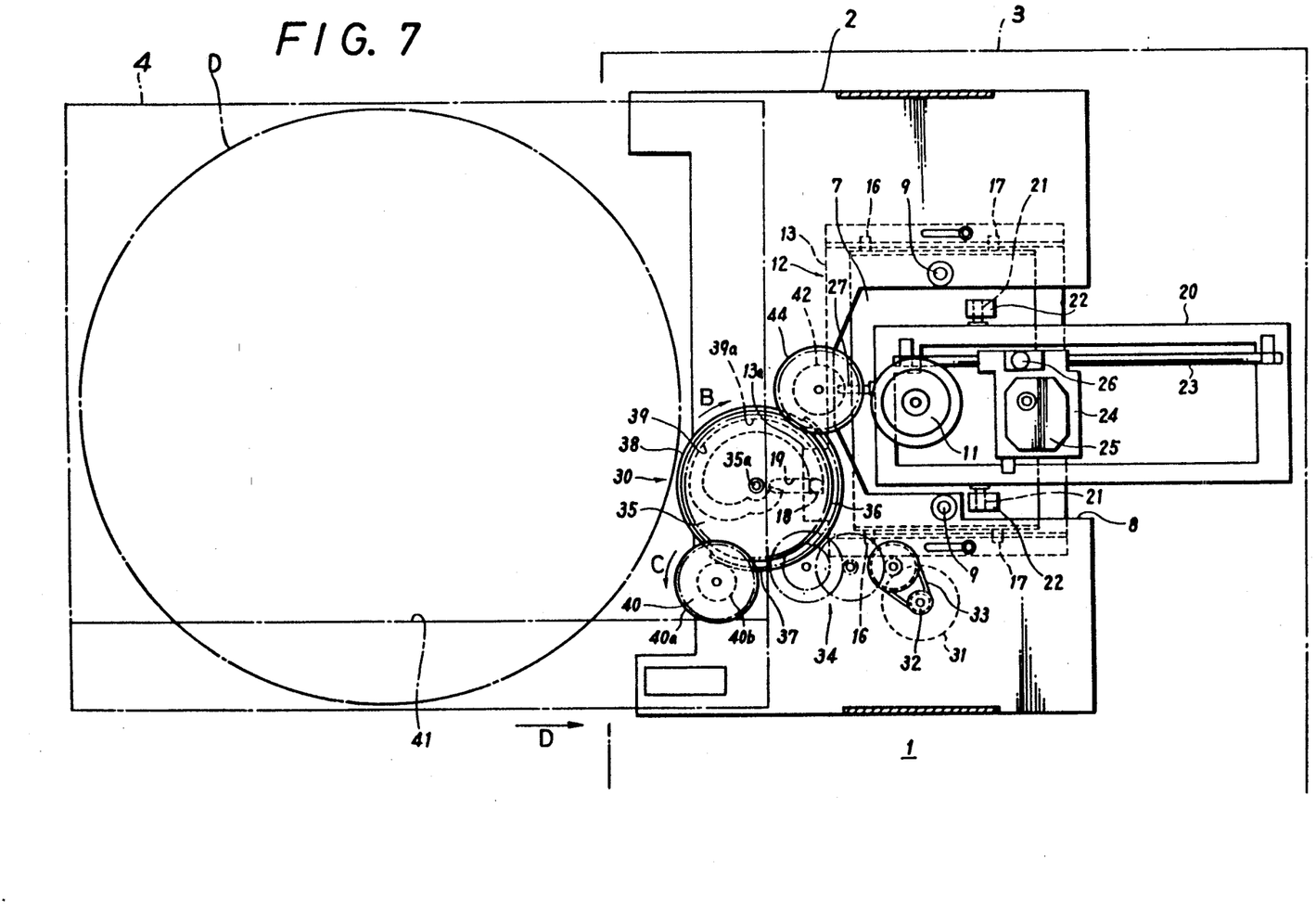
FIG. 7 is a plan view of the optical disc player shown in FIG. 1, and to which reference will be made in explaining an operation of the optical disc player.

When the disc tray 4 is fully withdrawn to the foremost moving position, i.e., the disc loading position, as shown in FIG. 7, the disc tray drive gear portion 37 of the rotation operation member 35 and the small-gear portion 40b of the idle gear 40 are meshed with each other, accordingly, the rotation operation member 35 and the disc tray 4 are coupled with each other via the idle gear 40.

Under this condition, the operation pin 18 of the elevating mechanism 12 is engaged with the starting portion of the loading area 39a of the cam groove 39 of the rotation operation member 35, causing the sliding member 13 to be located at the rear position. Therefore, as shown in FIG. 3A, the supporting pins 16 and 17 of the movable chassis 7 are engaged with the front edge lower portions of the elongated openings 14 and 15 of the slide member 13, placing the movable chassis 7 at the lower position.

Figure 4A:
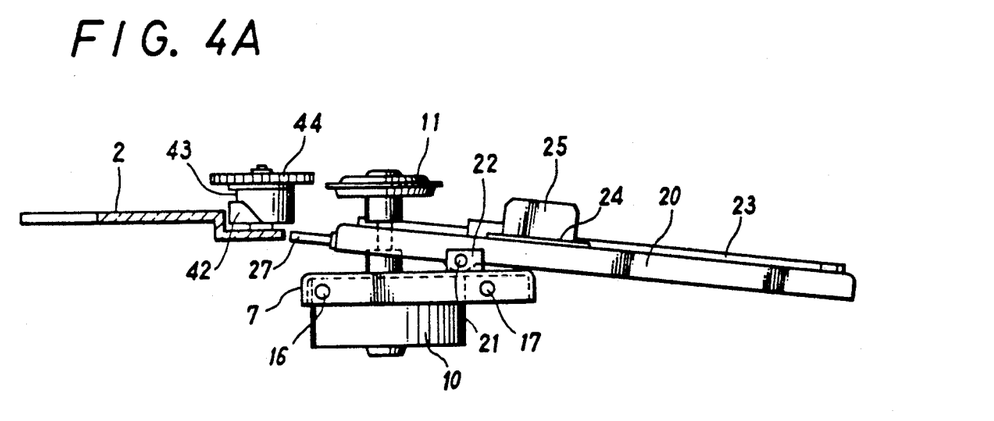
FIGS. 4A, 4B and 4C are side views of a tilt adjusting mechanism of the optical disc player shown in FIG. 1, and to which reference will be made in explaining an operation of the tilt adjusting mechanism, respectively.

Under the condition that the movable chassis 7 is placed at the lower position, as shown in FIG. 4A, the engagement lever 27 of the pickup supporting frame 20 supported on the movable chassis 7 are made distant from the cam member 42 in the vertical direction, in other words, the cam member 42 and the engagement lever 27 are not in engagement with each other, whereby the rotation operation member 35 and the pickup supporting frame member 20 are distant from each other from a functional standpoint.

From the above-described state, when the motor 31 is rotated in one direction, for example, in the positive direction, the rotation operation member 35 rotates in the clockwise direction (i.e., the direction shown by an arrow B in FIG. 7), whereby the idle gear 40 rotates in the counterclockwise direction (i.e., the direction shown by an arrow C in FIG. 7), transmitting the rotation of the rotation operation member 35 through the idle gear 40 to the disc tray 4. As a result, the disc tray 4 moves rearwards (i.e., the direction shown by an arrow D in FIG. 7), carrying the disc D to the disc reproducing position (i.e., the position shown in FIG. 8). Therefore, the disc loading operation is carried out.

Figure 8:
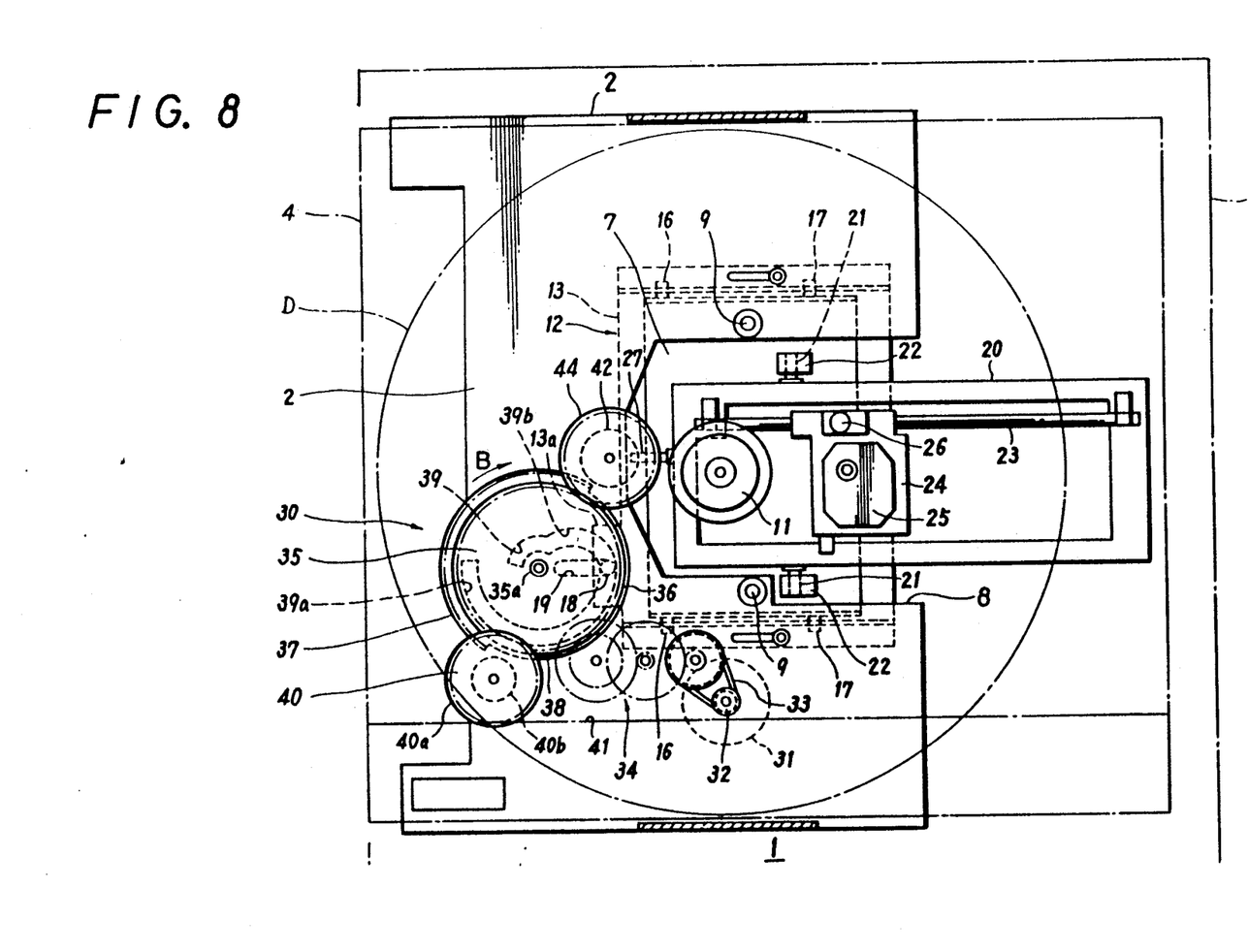
FIG. 8 is a plan view of the optical disc player shown in FIG. 1, useful in explaining another operation of the optical disc player of the present invention.

When the disc tray 4 is fully withdrawn and the disc loading operation is ended, as shown in FIG. 8, the disc tray drive gear portion 37 of the rotation operation member 35 is released from the small-gear portion 40b of the idle gear 40 and the geneva stop portion 38 is opposed to the small-gear portion 40b, resulting in the rotation operation member 35 and the disc tray 4 being functionally separated from each other.

In this fully-withdrawn state of the disc tray 4, the disc tray 4 is locked by a pre-determined locking device (not shown) so that it is inhibited from moving.

In the above-described loading operation, in accordance with the rotation of the rotation operation member 35, the operation pin 18 of the elevating mechanism 12 moves through the loading area 39a of the cam groove 39. In that case, however, the loading area 39a of the cam groove 39 is formed as the arc about the central rotation shaft 35a of the rotation operation member 35 as described hereinbefore, so that the position of the operation pin 18 in the front to rear direction is not changed. Consequently, the sliding member 13 of the elevating mechanism 12 is not activated, keeping the movable chassis 7 at the same lower position.

Figure 9:
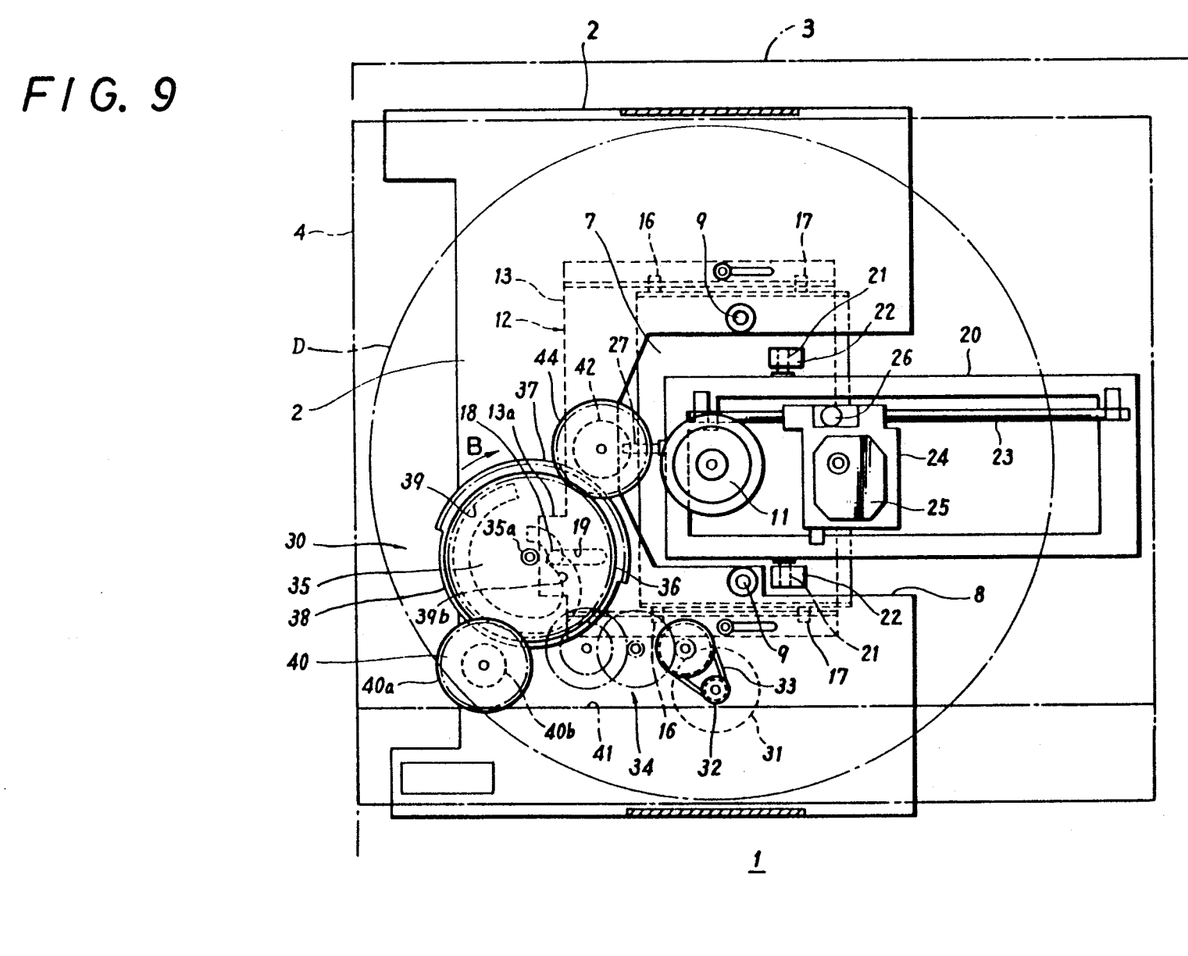
FIG. 9 is a plan view of the optical disc player shown in FIG. 1, useful in explaining still another operation of the optical disc player of the present invention.

After the above-described loading operation is completed, the motor 31 is continuously driven, causing the rotation operation member 35 to further rotate in the clockwise direction (i.e., the direction shown by an arrow B in FIG. 8). When the operation pin 18 in engagement with the cam groove 39 is moved from the loading area 39a to the chucking area 39b, the operation pin 18 is guided along the groove-shape of the chucking area 39b and moved forward (see FIG. 9). Consequently, the slide member 13 moves forward, urging the engagement positions of the supporting pins 16 and 17 of the movable chassis 7 relative to the elongated openings 14 and 15 to move from the lower position to the upper position as shown in FIG. 3B. In other words, the movable chassis 7 is supported by the guide shafts 9 so that it can move only in the vertical direction and it is inhibited from moving in the front and rear direction. Thus, when the slide member 13 moves forward, the inclined edges of the elongated openings 14 and 15 push the supporting pins 16 and 17 of the movable chassis 7 in the upward direction, causing the movable chassis 7 to be lifted in the vertical direction. When the movable chassis 7 is lifted as described above, the disc table 11 lifts the optical disc D from the disc tray 4 and urges the optical disc D against the chucking member 6 thereby performing the chucking operation and positioning the disc D so that it can be reproduced.

Figure 4B:
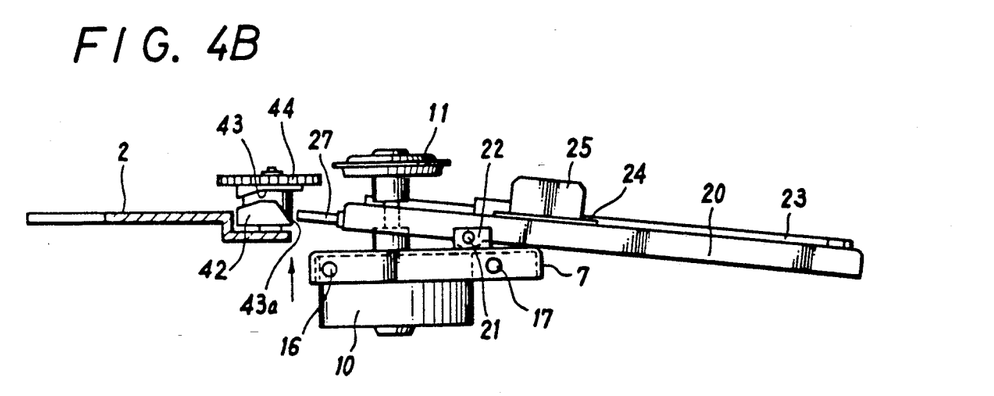

During the period in which the movable chassis 7 is moved in the upper direction as described above, as shown in FIG. 4B, the engagement lever 27 of the pickup supporting frame 20 supported on the movable chassis 7 enters the cam groove 43 of the cam member 42 from the underside of the opening portion 43a so as to engage with the cam groove 43. In this operation, the rotation of the cam member 42 and the movement of the movable chassis 7 are synchronized with each other so that, when the movable chassis 7 is moved upward, the engagement lever 27 properly opposes the opening portion 43a of the cam groove 43.

Figure 4C:
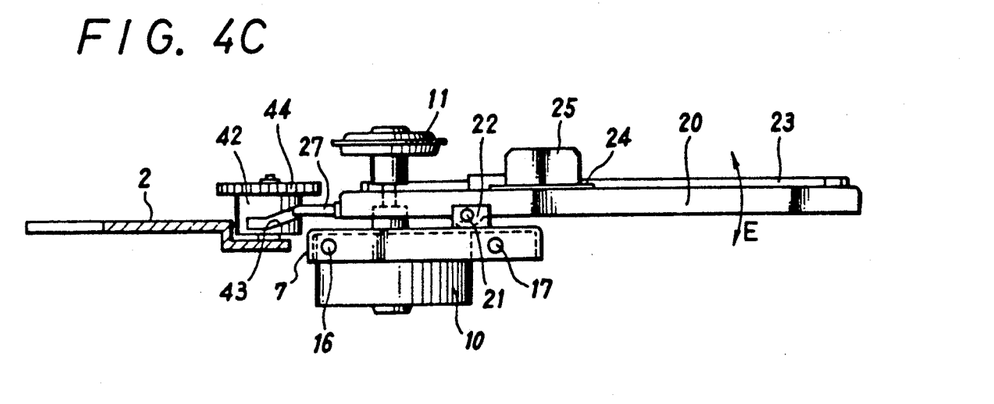

When the pickup supporting frame 20 rotates about the supporting shaft 21 in accordance with the ascension of the movable chassis 7 and the movable chassis 7 is fully moved upward to complete the disc chucking operation, as shown in FIG. 4C, the engagement lever 27 of the pickup supporting frame 20 is completely engaged with the cam groove 43 of the cam member 42. If the skew of the disc D is detected by the skew detecting device 26 during the reproduction of the disc D, the motor 31 is rotated in the clockwise direction or in the counterclockwise direction on the basis of the detected signal from the skew detecting device 26, whereby the cam member 42 is rotated through the rotation operation member 35. Thus, the pickup supporting frame 20 is guided by the cam groove 43 and is skewed about the support shaft 21 in the direction shown by an arrow E in FIG. 4C. Consequently, the optical axis of the optical pickup head 25 provided on the pickup supporting frame 20 is inclined with a proper angle corresponding to the skew of the disc D. In other words, the tilt angle of the optical pickup head 25 is adjusted so that the optical axis of the optical pickup head 25 is placed at a right angle relative to the recording surface of the disc D. More precisely, the optical axis of the optical pickup head 25 is placed in the direction vertical to the signal recording surface of the disc D.

In the aforenoted operation in which the tilt angle of the optical pickup head 25 is adjusted, the rotation operation member 35 is rotated within the range in which the operation pin 18 of the elevating mechanism 12 is in engagement with the tilt area 39c of the cam groove 39 as shown in FIG. 2. Further, the tilt area 39c is formed as the arc extended about the rotation central shaft 35a of the rotation operation member 35 as described hereinbefore. As a result, the positions of the operation pin 18 in the front to rear direction is not changed at all so that the elevating mechanism 12 is made inoperative, maintaining the movable chassis 7 at the elevated position, i.e., maintaining the disc chucking condition.

In the optical disc player of this embodiment, since the single motor 31 can perform all operations such as the movement of the disc tray 4 (disc loading), the ascension of the movable chassis 7 (chucking) and the skew of the pickup supporting frame 20 (tilt adjustment of the optical pickup head), the arrangement of the optical disc player of the invention can be simplified as compared with the prior-art optical disc player in which the tilt adjustment of the optical pickup head is performed by a dedicated second motor, which provides a decreased manufacturing cost and an inexpensive optical disc player.

Further, in the optical disc player of this embodiment, since the chucking mechanism portion is arranged such that the movable chassis 7 with the spindle motor 10 is moved up and/or down in the vertical direction relative to the stationary chassis 2, the optical disc player of this invention can be made compact as compared with the prior-art optical disc player in which the movable chassis 7 is rotated with an inclination relative to the stationary chassis 2. Therefore, as is clear from the figures of the invention, a wide spacing can be provided within the outer housing 3, whereby the portion in which the circuit board or the like is incorporated can be increased in size sufficiently. This leads to the increase of freedom in designing the circuit board and the outer housing.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

We claim as our invention:

1. An optical disc player comprising:
   a housing;
   a disc supporting and rotating portion for supporting and rotating an optical disc;
   disc carrying means arranged for freely moving between a disc removal position extending from sad housing and a disc drawn-in position within said housing;
   elevating means including an engagement pin and being arranged for elevating said disc supporting and rotating means;
   drive means including a motor connected to said disc carrying means through a gear train and including a rotation operation member having a first cam groove with three operational areas and with said engagement pin engaged in said first cam groove, said rotation operation member causing said disc carrying means to be moved between said disc removal position and said disc drawn-in position in response to rotation of said motor while said engagement pin is in a first of said three operational areas;
   said elevating means elevating said disc supporting and rotating portion in a vertical direction relative to said housing in response to rotation of said motor while said engagement pin is in a second of said three operational areas;
   a pickup supporting arm including an engagement lever and being supported by said disc supporting and rotating portion so as to be moved vertically therewith by said elevating means and being adapted to skew relative to a surface of said optical disc and having an optical pickup head mounted thereon; and
   a cam member rotated by said rotation operation member in response to rotation of said motor while said engagement pin is in a third of said three operational areas and having a second cam groove engaged with said engagement lever of said pickup supporting arm, rotation of said cam member by said rotation operation member causing said engagement lever to travel along said second cam groove, thereby causing said pickup supporting arm to skew relative to said disc surface.

2. An optical disc player according to claim 1, further comprising a tilt sensor provided on said optical pickup head, wherein said cam member is rotated in response to a detected output from said tilt sensor, whereby said optical pickup supporting arm becomes skewed.

3. A optical disc player according to claim 2, wherein said second cam groove of said cam member has an opening portion which opposes said engaging lever provided on an end of said pickup supporting arm when said disc supporting and rotating portion supporting said pickup supporting arm is elevated in a vertical direction by said elevating means.

4. An optical disc player according to claim 3, wherein said disc carrying means includes a disc tray having a concave portion on which an optical disc is loaded and wherein said rotation operation member includes a gear portion for meshing with a rack located on said disc tray and moving said disc tray between said disc removal position and said disc drawn-in position in response to rotation of said motor.

5. An optical disc player comprising:
   a disc tray on which an optical disc is loaded and being movably connected to a first chassis so that said disc tray is freely moved between a disc loading position and a disc playback position;
   a second chassis to which a disc rotating mechanism is connected, said second chassis being arranged for movement in a vertical direction relative to said first chassis;
   elevating means mounted on said first chassis and being operable for moving said second chassis in the vertical direction, said elevating means including an engagement pin; and
   drive means including a motor for moving said disc tray between the disc loading position and the disc playback position in response to rotation of said motor and including a rotation operation member having a first cam groove with three operational areas and with said engagement pin engaged in said first cam groove, said rotation operation member causing said disc tray to be moved between said disc loading position and said disc playback position in response to rotation of said motor while said engagement pin is in a first of said three operational areas;
   said elevating means elevating said disc rotating mechanism in a vertical direction relative to said first chassis in response to rotation of said motor while said engagement pin is in a second of said three operational areas;
   a pickup supporting arm including an engagement lever and being supported by said second chassis so as to be moved vertically therewith by said elevating means and being adapted to skew relative to a surface of said optical disc and having an optical pickup head mounted thereon; and
   a cam member rotated by said rotation operation member in response to rotation of said motor while said engagement pin is in a third of said three operational areas and having a second cam groove engaged with said engagement lever of said pickup supporting arm, rotation of said cam member by said rotation operation member causing said engagement lever to travel along said second cam groove, thereby causing said pickup supporting arm to skew relative to said surface of said optical disc.

6. An optical disc player according to claim 5, wherein said second chassis includes an engaging member and said first chassis includes a slide member having a rectangular opening formed at an angle therein relative to a direction of movement of said slide member, and wherein said engaging member of said second chassis engages said rectangular opening, whereby said engaging member of said second chassis travels along said rectangular opening when said slide member is slidably moved by said elevating means.

7. An optical disc player comprising:
   base means;
   a disc tray member arranged to freely move in a horizontal direction between a disc removal position and a disc drawn-in position;
   drive means including cam means and being operable for moving said disc tray member between said disc removal position and said disc drawn-in position;
   disc playing means including disc rotating means, an optical pickup, pickup supporting means, and engaging means, said pickup supporting means being mounted so as to skew relative to a disc surface, said optical pickup being mounted on said pickup supporting means, said engaging means engaging said cam means for movement thereby, said disc playing means being movably mounted on said base means for movement between an up position and a down position, as said engaging means is moved by said cam means; and guide means for guiding said disc playing means for movement between said up position and said down position, wherein said cam means has a cam groove including an open portion at one end thereof, a loading portion corresponding to the movement of said disc tray member, a chucking portion contiguous said loading portion for moving said disc playing means in the up and down direction, and a tilt portion contiguous with said chucking portion, wherein said cam means is rotated to skew said pickup supporting means, said engaging means facing said open portion of said cam groove when said tray member is at said disc withdrawing position and said disc playing means is at said down position, said engaging means being engaged with said tilt portion of said cam groove when said tray member is at said disc drawn-in position and said disc playing means is at said up position.

* * * * *

UNITED STATES PATENT AND TRADEMARK OFFICE
CERTIFICATE OF CORRECTION

PATENT NO. : 5,172,361
DATED : December 15, 1992
INVENTOR(S) : Hiroyuki Urushibata, et. al.

It is certified that error appears in the above-indentified patent and that said Letters Patent is hereby corrected as shown below:

On the Title page, item [57], Abstract, line 9, change "vertial" to --vertical--.

Column 4, line 66, change "skewd" to --skewed--

Column 7, line 9, delete "," second occurrence--.

Column 9, line 10, change "sad" to --said--.

Signed and Sealed this

Twenty-eighth Day of June, 1994

Attest:

BRUCE LEHMAN

*Attesting Officer*  *Commissioner of Patents and Trademarks*